US006847956B2

(12) United States Patent
Manicke et al.

(10) Patent No.: US 6,847,956 B2
(45) Date of Patent: Jan. 25, 2005

(54) SYSTEM AND METHOD FOR DETERMINING SPECIFIC REQUIREMENTS FROM GENERAL REQUIREMENTS DOCUMENTS

(75) Inventors: Paul Stephen Manicke, West Chester, OH (US); Mark Kevin McCullough, Liberty Township, OH (US); Bethany Bleil Kniffin, Niskayuna, NY (US); Leslie McLean Hellemann, Lebanon, OH (US); Vincent I.A. Van Den Briel, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 666 days.

(21) Appl. No.: 09/777,941

(22) Filed: Feb. 6, 2001

(65) Prior Publication Data

US 2002/0107825 A1 Aug. 8, 2002

(51) Int. Cl.[7] .................................................. G06N 5/02
(52) U.S. Cl. ......................................... 706/47; 707/103
(58) Field of Search .......................... 706/47; 707/103; 713/176; 156/64

(56) References Cited

U.S. PATENT DOCUMENTS

| 5,716,469 A | * | 2/1998 | Higgins ........................ 156/64 |
| 6,405,211 B1 | * | 6/2002 | Sokol et al. ............. 707/103 Y |
| 6,609,200 B2 | * | 8/2003 | Anderson et al. ........... 713/176 |

OTHER PUBLICATIONS

"MASS® Solution Overview," Cohesia Corporation, http://www.cohesia.com/product/prod_overview.htm, accessed Nov. 22, 2000, one page.

* cited by examiner

Primary Examiner—Wilbert L. Starks, Jr.
(74) Attorney, Agent, or Firm—William Scott Andes; Armstrong Teasdale LLP

(57) ABSTRACT

A system and method of using at least one computer to determine which requirements from a general requirements document apply to a specific situation. The invention includes providing a logic model for the general requirements document and receiving data relating to the specific situation. The collected data and the logic model are used to identify which requirements apply to the specific situation. Lastly, a listing of the identified requirements is output.

25 Claims, 4 Drawing Sheets

[ EDIT INPUT PARAMETERS ] [ VIEW OUTPUT ] [ VIEW LOGIC ]

RECOMMENDED PROCESS — 10002 – GAS SHIELDED ARC WELD

| CN REV | DRAW REQ. | SHEET ZONE | CHAR CLASS | CTQ | OP. NO. | HOW GENERATED AND CONTROLED | OP. NO. | MEAS EQUIP | JUSTIFI | SER NO. | RESULTS | DATE |
|---|---|---|---|---|---|---|---|---|---|---|---|---|
| 1 | MINIMU | 5.6 | MINOR | | | | | | | | | |
| 2 | MAX A | 5.6 | MINOR | | | | | COMM | | | | |
| 3 | SOME | 3.4b | MINOR | | | | | | | | | |
| 4 | IN FUL | 4.7.6 | MINOR | | | | | VISUA | 100% | | | |
| 5 | FILLET | 4.6.6 | MINOR | | | | | GAUGE | 100% | | | |
| 6 | TABLE | 4.7.2 | MINOR | | | | | | | | | |
| 7 | TABLE | 4.8.2 | MINOR | | | | | | | | | |
| 8 | TABLE | 4.9.1 | MINOR | | | | | | | | | |
| 9 | TABLE | 4.0. | MINOR | | | | | | | | | |

[ GO! VIEW OUTPUT ] [ VIEW PRINTABLE OUTPUT ] [ VIEW FILE ]

SPECIFICATIONS:
10001
10002
10003
10004
10005
10006
10007
10008
10009
10010

FIG. 3

SYSTEM AND METHOD FOR DETERMINING SPECIFIC REQUIREMENTS FROM GENERAL REQUIREMENTS DOCUMENTS

BACKGROUND OF THE INVENTION

This invention relates generally to identifying situation specific requirements from general requirements documents and more particularly to automatically identifying such requirements.

In providing services or products, there are typically many requirements that must be met to produce services and products that meet expectations. Some examples of such requirements include specification requirements that apply to component manufacture, standard design requirements that apply to a specific design activity, quality requirements that apply to a specific manufacturing or purchasing situation, and procedural requirements that apply to a specific business activity. For instance, contracts to provide services or products often prescribe certain quality-related requirements. Engineering drawings used in the manufacture of product components typically require that some manufacturing processes be carried out in accordance with particular conventions, such as internal procedures, industry standards and government specifications. These quality-related requirements and manufacturing conventions are typically described in documents that can be many pages long and complex in nature.

Thus, an individual will often need to consult one or more such documents (referred to herein as general requirements documents) when addressing a specific situation. However, not all requirements in a general requirements document will necessarily apply to each specific situation, as different requirements can apply to different situations. The user must thus determine which requirements apply for the specific situation. Currently, the process for identifying situation specific requirements in a general requirements document is for the user to read through the document, or at least substantial portions thereof, and determine which sections, paragraphs and lines apply to the specific situation. This approach to determining situation specific requirements can be tedious and time consuming, and therefore costly. Moreover, because the user must interpret the language and content of these documents to determine what requirements apply, there is inherently some variation in interpretation from one individual to another. This variation can result in inconsistent, and possibly inadequate or incorrect, identification of requirements. Variations in interpreting requirements documents can also result due to changes and modifications to the documents that occur over time. Document clarity and intent can be reduced as modifications add substitutions, exceptions and special cases.

In situations involving the formulation of an engineering design, imprecise identification of the requirements can lead to designs that may not fully conform to accepted engineering design practice. In the case of manufacturing plan definition, component acquisition or component inspection, imprecise requirements identification can lead to components that do not fully meet the design intent. Such situations can subsequently lead to problems in manufacturing, assembly, field performance and component life, and the additional costs associated with such problems.

Accordingly, there is a need for accurately identifying situation specific requirements on a quick, consistent basis.

BRIEF SUMMARY OF THE INVENTION

The above-mentioned need is met by the present invention, which provides a system and method of using at least one computer to determine which requirements from a general requirements document apply to a specific situation. The invention includes providing a logic model for the general requirements document and receiving data relating to the specific situation. The collected data and the logic model are used to identify which requirements apply to the specific situation. Lastly, a listing of the identified requirements is output.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 3 graphically illustrates a user interface screen in the output mode.

DETAILED DESCRIPTION OF THE INVENTION

Figure 1:
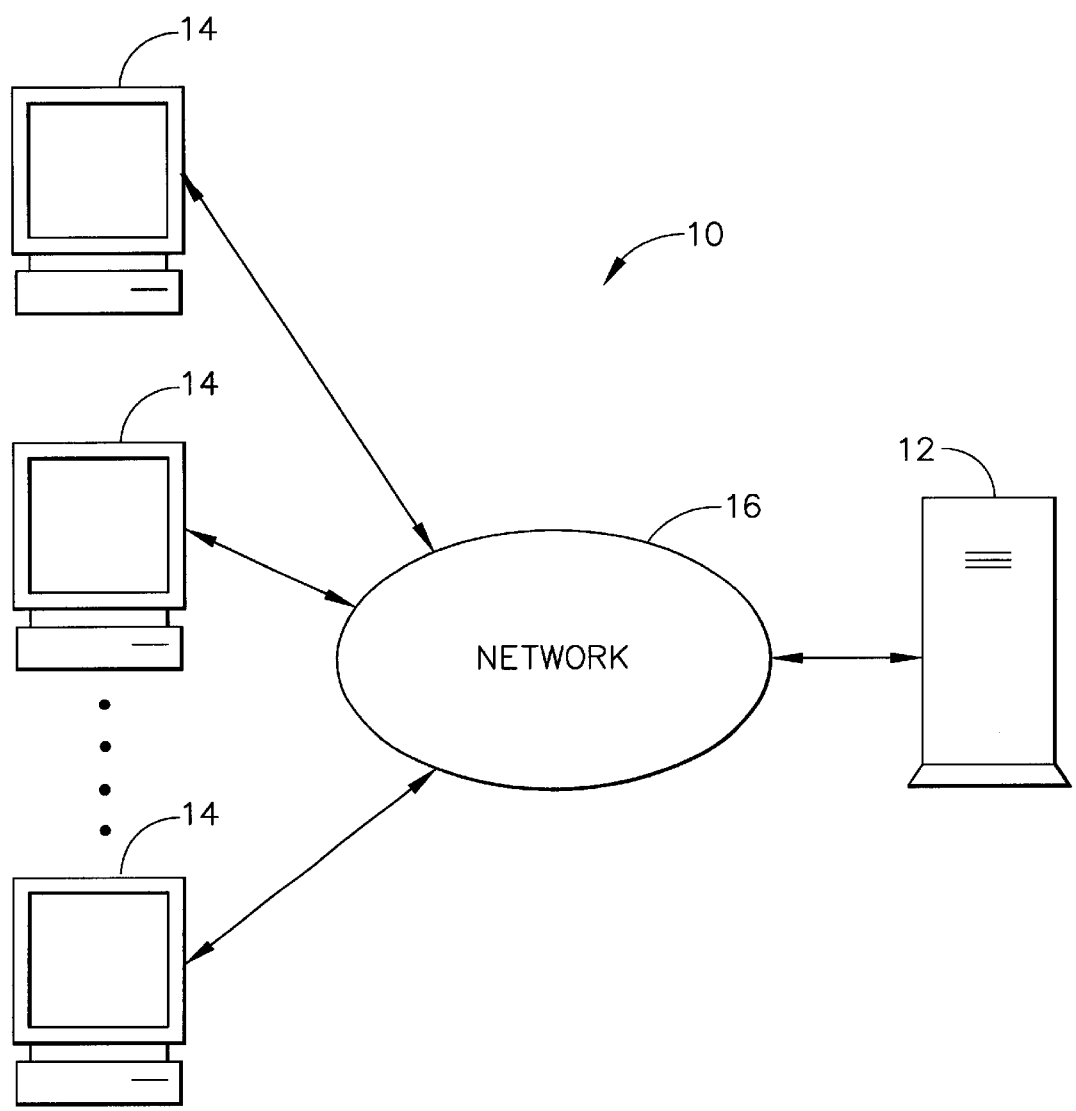
FIG. 1 is a block diagram of a computer-based system for identifying situation specific requirements from general requirements documents.

The present invention includes a computer-based system for precisely and automatically determining what specific requirements from a general requirements document apply for a specific situation. In one preferred embodiment, the computer-based system includes a computer program, referred to herein as the logic processing software, that is configured to accept pertinent data inputs from a user and then automatically identify the situation specific requirements in a general requirements document that apply to the particular situation as identified by the user's inputs.

Prior to using the system, the user first determines which requirements documents need to be analyzed for requirements specific to the user's situation. To determine the relevant requirements documents, the user reviews data, forms, contracts, drawings and other documents to identify citations or references to particular requirements documents by number or name. Once the user has identified the requirements documents that need to be analyzed for specific requirements, the user is ready to access the system. As will be described in more detail below, the system can be accessed in a variety of manners, such as via the Internet or locally via software resident on the user's computer or storage media such as a floppy disk or CD-ROM.

Upon access to the system, the user is first presented with a directory of general requirements documents to choose from. The user selects the appropriate document in the directory, whereupon the logic processing software launches an input screen specific for that requirements document. The input screen has questions that prompt the user for information that describes the particular situation with which the user is dealing. (The user may obtain this information by referring to documents such as component drawings, contracts or other data. The information provided by the user may also reflect the user's own knowledge regarding the specific situation.) The user directly inputs the required information into fields or selects the appropriate choices from pull-down menus. Illustrations may be provided to assist the user in understanding what information is being requested.

Once all of the information is inputted, the logic processing software compares the information against a logic model of rules for the applicable requirements document. The logic model of rules may be in the form of a decision tree or spreadsheet or a combination of both. The logic model of rules may also include equations. Based upon the logic model, the logic processing software determines which requirements contained in the applicable general requirements document apply to the input conditions entered by the user. The system then displays the selected requirements for the user. The user can cause the system to send the output to various online or hard copy output devices in either a formatted or non-formatted mode. If additional requirements documents need to be analyzed, the user repeats the process for each such document until all of the documents have been analyzed. The system is able to determine the applicable requirements much more quickly than the conventional approach of reading the general requirements document and manually identifying the applicable requirements. In addition, the system will consistently provide the same accurate response for a given set of input information and is not subject to individual user interpretation of the requirements document.

Referring now to the drawings wherein identical reference numerals denote the same elements throughout the various views, FIG. 1 shows one embodiment of a computer-based system 10 that uses the above-mentioned logic processing software for identifying situation specific requirements in a general requirements document.

The requirements identification system 10 includes a central host or server computer 12 and one or more user computers 14 connected by a computer network 16. In one preferred embodiment, the network 16 is the World Wide Web, although it possible to employ other types of computer networks such as a local area network or a wide area network. As used herein, the "World Wide Web" (or simply the "Web") refers to the distributed collection of interlinked, computer viewable hypertext documents (commonly referred to as web pages) that are accessible via the Internet. As is known in the art, such hypertext documents are accessed with client and server software using standard Internet protocols such as Transmission Control Protocol/Internet Protocol (TCP/IP) and Hypertext Transport Protocol (HTTP). Currently, HTTP is the primary protocol for allowing applications to locate and acquire web pages, and web pages are notated with Hypertext Markup Language (HTML). However, as used herein, the terms "World Wide Web" and "Web" are intended to encompass not only HTTP and HTML, but also any current or future transport protocols or markup languages that may be used in place of, or in addition to, HTTP and HTML.

The user computers 14 may be any type of computing device that are capable of transmitting requests and receiving web pages over the network 16. For example, the user computers 12 can be personal or work station computers having a central processing unit (CPU), a hard disk and one or more auxiliary disk drives for computer-readable storage media such as floppy disks, CD-ROMs or other optical media, magnetic tapes and the like. As is known in the art, the user computers 12 will typically include known input/output devices such as a keyboard, a pointing device, a monitor and a printer. A communication device, such as a modem, is included for providing the computers 12 with a connection to the computer network 16. Those skilled in the art will appreciate that the present invention is not limited to personal or work station computers and can be implemented on other types of computer systems such as main frame computers, laptop computers and personal digital, assistants including wireless handheld computers, The server computer 12 includes a web server (i.e., a logic processing software that serves requested HTML pages or files), and each user computer 14 includes conventional web browser software that allows the user computers 14 to access the web pages stored on the server computer 12, as well as other data stored on any other server systems connected to the network 16. Generally, the web server receives requests to access web pages from one or more of the user computers 14 and provides the web pages to the requesting user computers 14. The server computer 12 also has the above-mentioned logic processing software for identifying situation specific requirements stored in its memory.

To utilize the requirements identification system 10, a user accesses the logic processing software on the server computer 12 with one of the user computers 14. Specifically, the user is able to access and launch the logic processing software by sending a request to the server computer 12 by inputting the appropriate Internet address or selecting the appropriate link on a web page. The server computer 12 responds by downloading a directory of available general requirements documents for the user to choose from, and the user responds by selecting a requirements document. The server computer 12 responds with an input form with which the user enters the required data and submits it back to the server computer 12. The server computer 12 processes the inputs provided by the user against the logic model resident on the server computer 12 and outputs to the user computer 12 the specific requirements that apply to the situation described by the user.

With this arrangement, the logic processing software can also be accessed by other users at other locations using one of the other user computers 12. This provides a distributed system that is capable of uniform distribution of the logic processing software to a number of sites. This embodiment is configured so that the logic processing is done on the server computer 12. In this configuration, the system 10 is able to provide security for the logic models and minimizes the amount of data that is transferred over the network 16. The central control of the logic processing software also ensures that the latest revision is being utilized by all users.

In one alternative, the logic processing software can be downloaded to the user computer 14 via the network 16 each time the user uses the system 10. In this case, the user submits a request to use the system 10 to the server computer 12 and the server computer 12 responds by downloading the logic processing software to the user computer 12. The logic processing software is not copied to the hard disk but rather is retained with the user computer's RAM for use during that session. Thus, the logic processing is done on the user computer 14 rather than the server computer 12. When the user is finished and exits the software, it must be downloaded once again from the server computer 12 to establish another session. While this approach does not provide the same security for the logic models as the previously described configuration, it does ensure that the latest revision of the logic processing software is used. Another alternative would be to download the logic processing software from the server computer 12 to the user computer local disk drive memory via the network 16. From that point on, the user can repeatedly run the logic processing software on the user computer 14 without further download, except as needed for updates.

In another alternative, the requirements identification system 10 can be implemented as a standalone computer system rather than a web-based system. In this case, the system would essentially comprise a single computer, such as one of the user computers 14 described above. As previously discussed, this could include personal or work station computers having a CPU, a hard disk, one or more auxiliary disk drives for computer-readable media such as floppy disks, CD-ROMs or other optical media, magnetic tapes and the like and known input/output devices. Other types of computer systems such as main frame computers, laptop computers and personal digital assistants including wireless handheld computers could also be used. The logic processing software could be accessed from a removable computer-readable medium, such as a floppy disk, CD-ROM or other optical medium, magnetic tape or the like, inserted into the appropriate drive. With this approach, the logic processing software could be accessed directly from the removable computer-readable medium, or it could be transferred to the computer's hard disk and accessed from there. As used herein, the term "computer-readable medium" refers generally to any medium from which stored data can be read by a computer. This includes not only removable media such as the aforementioned floppy disk or CD-ROM, but also non-removable media such as the hard disk.

Figure 2:
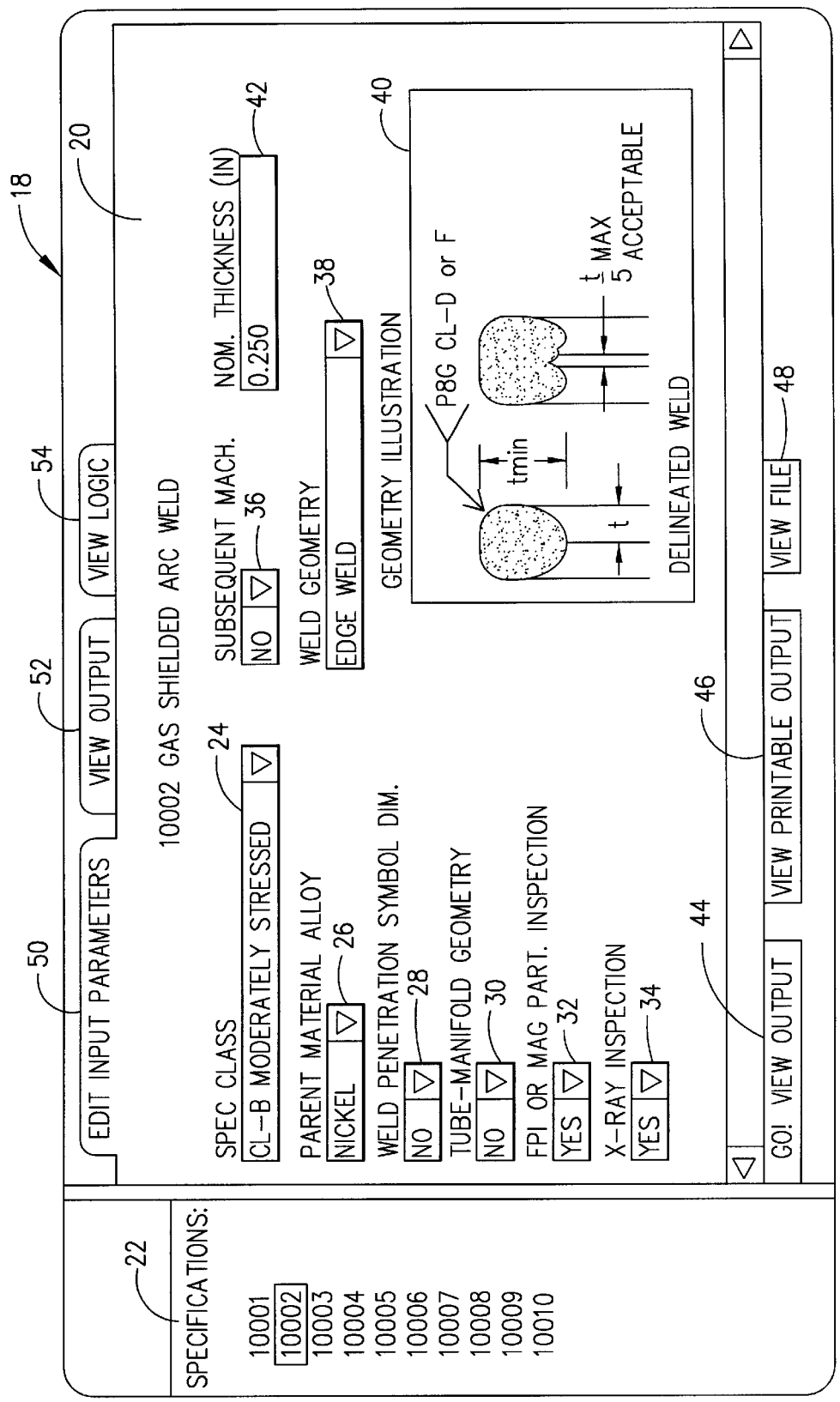
FIG. 2 graphically illustrates a user interface screen in the input mode.

As mentioned above, a user utilizes the requirements identification system 10 by accessing and launching the logic processing software with one of the user computers 14 (as either a networked or standalone computer). Once launched, the logic processing software generates a user interface screen 18 that is displayed on the monitor of the user computer 14, as shown in FIG. 2. The user interface screen 18 is a graphical user interface that guides the user through the steps of the requirement identification process as will now be described. The following description will involve an exemplary process of extracting measurable requirements (sometimes referred to as accountable characteristics) from an engineering specification. In the illustrated example, a welding specification is used; however, it should be noted that the present invention is not so limited. The present invention can be used with any type of specification. It is also applicable to other types of requirements such as standard design requirements that apply to a specific design activity, quality requirements that apply to a specific manufacturing or purchasing situation, and procedural requirements that apply to a specific business activity.

The interface screen 18 includes an input/output section 20 and a directory section 22 on the left-hand side thereof. The directory section 22 displays a directory of available general requirements documents from which the user can select. In the example of FIG. 2, a directory of engineering specifications is shown, although it should be noted that other types of general requirements documents, such as procedures and standards could be included as well. It should also be noted that, although not shown in FIG. 2, the requirements documents in the directory section could be organized into folders. For example, the documents could be arranged by the type of document. The documents also could be arranged by subject matter. That is, there could be a folder for all engineering specifications dealing with welding processes, a folder for all engineering specifications dealing with machining processes, and so on.

The user selects the appropriate requirements document from the directory, and an input screen corresponding the selected requirements document is displayed in the input/output section 20 of the interface screen 18. The input screen includes a number of input windows that allow the user to enter information relating to the specific situation with input peripherals such as a pointing device and/or keyboard. Each of the input windows is labeled with a description of the type of data to be entered to guide the user in entering the proper data therein. The data are entered by selecting inputs from a pull-down menu of items or by directly entering information into the input window. The data entered by the user are used by the logic processing software in identifying the applicable requirements. The input windows are designed to elicit from the user all the information that is needed for the requirements identification.

In the welding specification example of FIG. 2, nine input windows are included in the input screen displayed in the input/output section 20. The first input window 24 includes a pull-down menu that provides a complete list of specification classes to choose from. Typically, there will be a number of different classes in an engineering specification, a different set of requirements pertaining to each class. Entering the appropriate class in the first input window 24 will indicate which set of requirements is applicable. The second input window 26 includes a pull-down menu from which the user selects the parent material of the parts being welded. Identifying the applicable material will affect which requirements apply.

The third, fourth, fifth, sixth and seventh input windows 28, 30, 32, 34 and 36 ail have a pull-down menu from which the user can select a yes or no answer. The third input window 28 relates to whether the welding process in question is weld penetration symbol dimensioned. This refers to instances in which the engineering drawing overrides specification requirements. If the drawing is weld penetration symbol dimensioned, then exceptions on the drawing will apply. Thus, if a positive answer is entered in the third input window 28, the logic processing software will provide an indication that one or more drawing requirements apply. The fourth input window 30 relates to whether the welding process involves tube-manifold geometry. If a positive answer is entered in the fourth input window 30, then the logic processing software will include applicable requirements pertaining to quality testing. The fifth input window 32 elicits whether fluorescent penetrant or magnetic particle inspection techniques are called for, and the sixth input window 34 elicits whether X-ray inspection is called for. If any of these are required, then specific requirements will apply. The seventh input window 36 pertains to whether subsequent machining of the weld is included. If subsequent machining is included, then the logic processing software will include applicable requirements for quality control measurements.

The eighth input window 38 includes a pull-down menu that provides a complete list of weld geometries. Here, the user enters the appropriate weld geometry, which will impact what requirements apply. An illustration window 40 is associated with the eighth input window 38. The illustration window 40 will show one or more illustrations that assist the user in the weld geometry selection. The illustrations change depending on which weld geometry is selected. Thus, if the illustrated geometry is shown in the drawing, then the user will know that the proper weld geometry has been selected. The ninth input window 42 allows the user to directly enter an appropriate numerical value relating to the nominal weld thickness. This data provides input as to which quality requirements apply.

It is emphasized that the present invention is not limited to the particular input screen shown in FIG. 2, which is merely presented as one example to facilitate description of the present invention. It should be understood that the configuration of the input screen, and the data received therein, will vary depending on what general requirements document is selected from the directory section 22.

Once all of the requested information has been entered in the input/output section 20, the user can click on a "GO View Output" button 44 near the bottom of the interface screen 18 to initiate processing of the inputted data and identification of the appropriate requirements. This results in the input screen being replaced with an output screen in the input/output section 20, as shown in FIG. 3. The output screen displays a minimally formatted listing of the requirements that apply to the specific situation (the welding specification in the illustrated example) for viewing by the user, as determined by the logic processing software. The output screen shows each identified requirement along with specific values that can be measured on the completed part. The outputted response can also include expert recommendations for inspection equipment and frequency. Two additional buttons are provided next to the "GO View Output" button 44: a "View Printable Output" button 46 and a "View in File Format" button 48. Clicking on the "View Printable Output" button 46 will cause the output screen to be displayed in a printable format. Clicking the "View in File Format" button 48 allows the user to output the identified requirements into a copyable file in a spreadsheet or word processing software application. The file can be outputted in either a non-formatted or formatted manner, depending on how the logic processing software is configured. Input screen tab 50 and output screen tab 52 are provided near the top of the input/output section 20 for allowing the user to switch back and forth between the input screen and output screen. A logic model tab 54 can be optionally provided. Selecting the logic model tab 54 will cause the corresponding logic model to be displayed in the input/output section 20.

As mentioned above, the logic processing software uses a logic model of rules to determine which requirements from the selected general requirements document apply to the specific situation. Thus, a logic model is provided for each general requirements document included in the directory section 22. Each logic model sets forth the decisions that must be made to determine which requirements are applicable to a specific situation. The construction of the logic models is done by one or more experts that define the decisions that must be made and which requirements apply to each response for each decision. The logic models thus provide consistent and accurate interpretations of the requirements documents.

Figure 4:
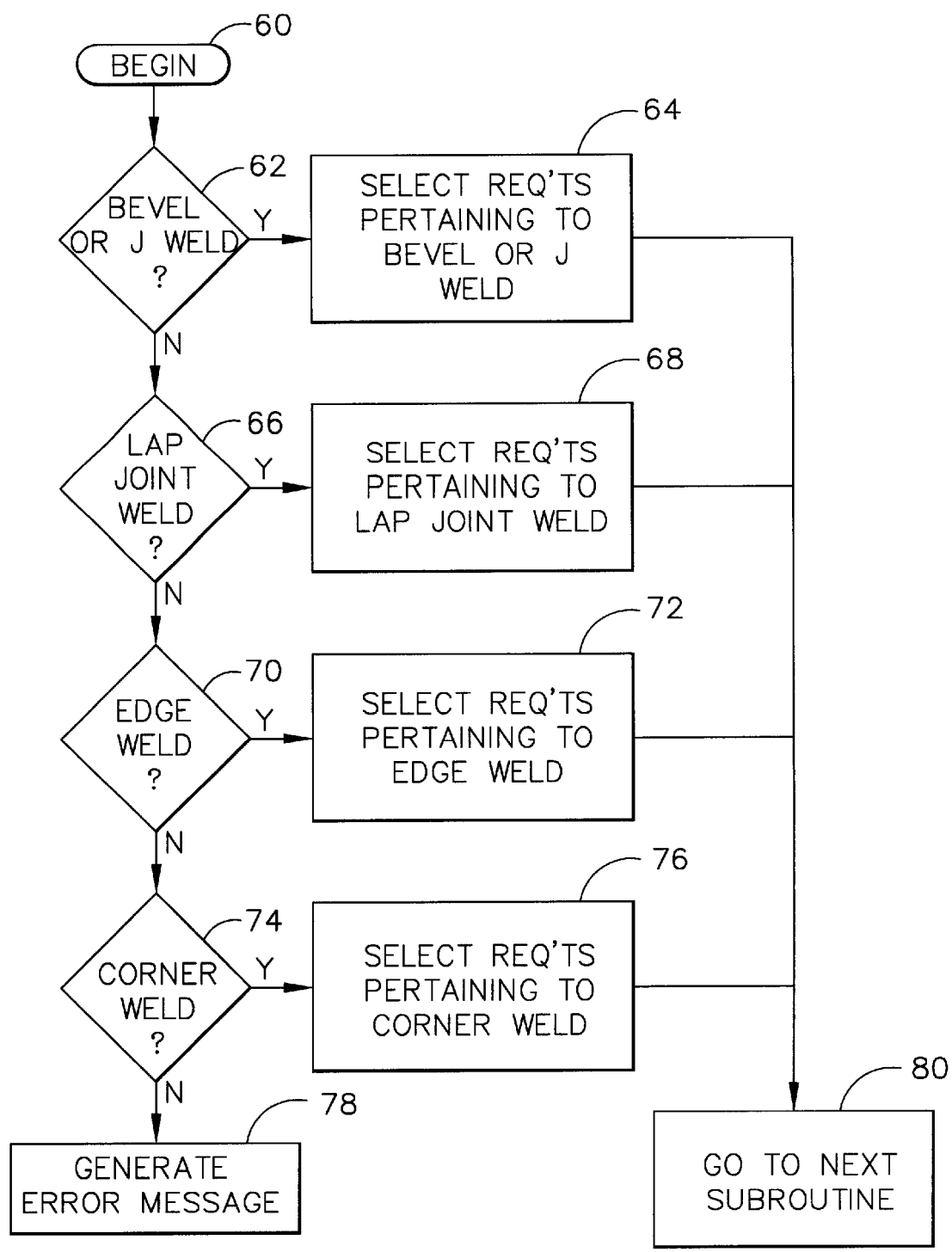
FIG. 4 is a flow chart illustrating a subroutine for the logic processing software of the present invention.

FIG. 4 shows a subroutine from a logic model that is applicable to the welding specification example described above in connection with FIGS. 2 and 3. The subroutine of FIG. 4 applies to the weld geometry data received in the eighth input window 38 of the input screen of FIG. 2. This subroutine is presented as one example to facilitate description of the present invention. For this purpose, it is assumed that there are four possible weld geometries described in the welding specification: bevel or J weld, lap joint, edge weld, and corner weld. It should be understood that the logic model would include additional subroutines that are applicable to the other data inputs.

The subroutine begins at block 60 and proceeds to block 62 where the subroutine inquires whether the bevel or J weld geometry has been entered. If it has, then the subroutine proceeds to block 64 where the requirements pertaining to bevel or J weld geometry are selected. If not, then the subroutine proceeds to block 66 where the subroutine inquires if the lap joint weld geometry has been entered. If it has, then the subroutine proceeds to block 68 where the requirements pertaining to lap joint weld geometry are selected. If not, then the subroutine proceeds to block 70 where the subroutine inquires if the edge weld geometry has been entered. If it has, then the subroutine proceeds to block 72 where the requirements pertaining to edge weld geometry are selected. If not, then the subroutine proceeds to block 74 where the subroutine inquires if the corner weld geometry has been entered. If it has, then the subroutine proceeds to block 76 where the requirements pertaining to corner weld geometry are selected. If not, then the subroutine proceeds to block 78 where the subroutine generates an error message that none of the available weld geometries have been selected. At this point, the user returns to the input screen and enters the appropriate weld geometry. Upon reaching any of the blocks 64, 68, 72 or 76, the appropriate requirements dictated by the weld geometry have been identified, and the subroutine is completed. Thus, from each of blocks 64, 68, 72 and 76, the logic model proceeds to the next subroutine. Once all of the subroutines are completed, all of the situation specific requirements that have been identified are outputted and displayed in output screen.

The logic processing software includes input and output error detection. In this case, the logic processing software analyses the situation-related data entered by the user via the input screen and prevents processing incorrect data, data that are in conflict, or data that can lead to confounding requirements. Such error detection leads to either automatic correction of user inputted data and/or user notification and subsequent corrective actions by the user. Through error detection, the user can modify the inputted data until no errors remain. At this point, clicking on the "GO View Output" button 44 to initiate processing of the inputted data will result in valid identification of the appropriate requirements.

The foregoing has described a system and method for determining specific requirements from general requirements documents. While specific embodiments of the present invention have been described, it will be apparent to those skilled in the art that various modifications thereto can be made without departing from the spirit and scope of the invention as defined in the appended claims.

What is claimed is:

1. A method of using at least one computer to determine which requirements from a general requirements document apply to a specific situation, said method comprising:

receiving data relating to said specific situation;

processing said data to identify which requirements apply to said specific situation; and outputting a listing of identified requirements.

2. The method of claim 1 wherein receiving data includes:

displaying a user interface screen on a computer, said user interface screen including at least one input window; and entering data in said input window.

3. The method of claim 2 wherein said user interface screen further includes an illustration window associated with said input window, said illustration window providing at least one illustration related to data to be entered in said input window.

4. The method of claim 2 wherein said user interface screen further includes a directory of available general requirements documents to choose from.

5. The method of claim 2 further comprising generating an error message if data is incorrectly entered.

6. The method of claim 1 wherein processing said data includes using a logic model for said general requirements document.

7. The method of claim 1 wherein said data is received with a first computer and said processing is performed with a second computer, said first and second computers being connected by a computer network.

8. A method of using at least one computer to determine which requirements from a general requirements document apply to a specific situation, said method comprising:
- providing a logic model for said general requirements document;
- receiving data relating to said specific situation;
- using said data and said logic model to identify which requirements apply to said specific situation; and
- outputting a listing of identified requirements.

9. The method of claim 8 wherein receiving data includes:
- displaying a user interface screen on a computer, said user interface screen including at least one input window; and
- entering data in said input window.

10. The method of claim 9 wherein said user interface screen further includes an illustration window associated with said input window, said illustration window providing at least one illustration related to data to be entered in said input window.

11. The method of claim 9 wherein said user interface screen further includes a directory of available general requirements documents to choose from.

12. The method of claim 9 further comprising generating an error message if data is incorrectly entered.

13. The method of claim 8 wherein said logic model is stored on a first computer and said data is received with a second computer, said first and second computers being connected by a computer network.

14. A computer-based system for determining which requirements from a general requirements document apply to a specific situation, said system comprising:
- means for storing a logic model for said general requirements document;
- means for receiving data relating to said specific situation;
- means for using said data and said logic model to identify which requirements apply to said specific situation; and
- means for outputting a listing of identified requirements.

15. The computer-based system of claim 14 wherein said means for receiving data includes means for displaying a user interface screen on a computer, said user interface screen including at least one input window in which data can be entered.

16. The computer-based system of claim 15 wherein said user interface screen further includes an illustration window associated with said input window, said illustration window providing at least one illustration related to data to be entered in said input window.

17. The computer-based system of claim 15 wherein said means for storing a logic model for said general requirements document includes logic models for other general requirements documents, and said user interface screen further includes a directory of available general requirements documents to choose from.

18. The computer-based system of claim 15 further comprising means for generating an error message if data is incorrectly entered.

19. The computer-based system of claim 14 wherein said means for storing a logic model resides on a first computer and said means for receiving data resides on a second computer, said first and second computers being connected by a computer network.

20. A computer-readable medium containing instructions for controlling a computer-based system to perform a method of determining which requirements from a general requirements document apply to a specific situation, wherein said method comprises:
- receiving data relating to said specific situation;
- processing said data to identify which requirements apply to said specific situation; and
- outputting a listing of identified requirements.

21. The computer-readable medium of claim 20 wherein said instructions cause said computer-based system to receive data by displaying a user interface screen on a computer, said user interface screen including at least one input window in which data can be entered.

22. The computer-readable medium of claim 21 wherein said user interface screen further includes an illustration window associated with said input window, said illustration window providing at least one illustration related to data to be entered in said input window.

23. The computer-readable medium of claim 21 wherein said user interface screen further includes a directory of available general requirements documents to choose from.

24. The computer-readable medium of claim 21 wherein said instructions cause said computer-based system to generate an error message if data is incorrectly entered.

25. The computer-readable medium of claim 20 wherein said instructions cause said computer-based system to use a logic model for said general requirements document in processing said data.

* * * * *